United States Patent [19]

Poralla et al.

[11] Patent Number: 5,006,558
[45] Date of Patent: Apr. 9, 1991

[54] METHOD FOR REDUCING STRESS IN PIGLETS PIGS AND POULTRY

[75] Inventors: Dieter M. Poralla, Wachenheim; Walter Kohler, Frankenthal, both of Fed. Rep. of Germany

[73] Assignee: BASF Aktiengesellschaft, Ludwigshafen, Fed. Rep. of Germany

[21] Appl. No.: 523,837

[22] Filed: May 15, 1990

Related U.S. Application Data

[63] Continuation of Ser. No. 269,443, Nov. 10, 1988, abandoned.

[30] Foreign Application Priority Data

Nov. 13, 1987 [DE] Fed. Rep. of Germany ....... 3738570

[51] Int. Cl.$^5$ .......................... A61K 31/19; A23L 1/00
[52] U.S. Cl. .......................................... 514/557; 426/2
[58] Field of Search ................... 514/557, 578; 426/69, 426/2, 682

[56] References Cited

U.S. PATENT DOCUMENTS

| | | | |
|---|---|---|---|
| 3,219,453 | 11/1965 | Bogdonoff et al. | 514/557 |
| 4,202,887 | 5/1980 | Talbot et al. | 426/2 |
| 4,735,809 | 4/1988 | Donovan et al. | 426/74 |
| 4,800,092 | 1/1989 | Miller | 426/69 |

FOREIGN PATENT DOCUMENTS

| | | |
|---|---|---|
| 1568280 | 2/1970 | Fed. Rep. of Germany . |
| 5398281 | 8/1978 | Japan . |
| 1341350 | 12/1973 | United Kingdom . |

OTHER PUBLICATIONS

Journal of Veterinary, Pharmaceutics and Therapeutics, vol. 10, (1978), pp. 119–126.
Praktischer Tierarzt, vol. 4 (1985), pp. 328–335.

Primary Examiner—Stanley J. Friedman
Assistant Examiner—Kevin E. Weddington
Attorney, Agent, or Firm—Oblon, Spivak, McClelland, Maier & Neustadt

[57] ABSTRACT

Complete feeds or supplementary feeds for fattening pigs, piglets and poultry, which consist of or contain magnesium dipropionate, are proposed. The feeds have an antistress effect in the animals.

9 Claims, No Drawings

METHOD FOR REDUCING STRESS IN PIGLETS PIGS AND POULTRY

This application is a continuation of application Ser. No. 269,443, filed on Nov. 10, 1988, now abandoned.

The present invention relates to a feed for piglets, fattening pigs and poultry, which contains an organic magnesium salt. The present invention furthermore relates to the use of this salt for the preparation of a feed for fattening pigs, piglets and poultry.

Magnesium is one of the mineral bulk elements, and from 62 to 70% of the magnesium in the animal organism are present in the skeleton while 30 to 37% are distributed over the intracellular space of the other organs. About 1% is present in extracellular fluids. Magnesium plays a complex role in the organism. Its many individual functions include its function as an enzyme activator of the intermediary metabolism and in particular its function in impulse transmission in the nervous system, where it acts as a calcium antagonist.

On the basis of present knowledge, there is no hormonal regulation system for magnesium metabolism. However, a certain level of magnesium in the blood is important for maintaining health and performance of animals. The bioavailability of the magnesium supplied is therefore of particular importance. In case of doses to cover requirements, utilization of magnesium supplied with the feed is in practice from 10 to 20%. The bioavailability of organic magnesium compounds is higher than that of inorganic magnesium compounds.

The use of magnesium salts in animal feed has long been known. For example, GB-A-1 341 350 describes the use of magnesium propionate or mixtures of magnesium propionate and magnesium acetate in feeds for ruminants. This is intended to avoid the occurrence of hypomagnesiemia. It is also claimed that milk production and milk quality are improved. Essentially the same subject matter is described in JP-A-53098/281.

The use of magnesium fumarate or calcium fumarate, if necessary in the form of double salts of phosphoric acid and/or water-soluble aliphatic carboxylic acids, as feed additives is described in DE-A-1 568 280, corresponding to U.S. Pat. No. 3,534,095. As stated there, a specific physiological action and increased retention are attributed to the fumarates, which, according to the publication, is of particular importance in feeds in the case of magnesium.

Test results are also available for another organic magnesium compound, magnesium aspartate hydrochloride (Mg-Asp-HCl).

Thus, Ali et al., Journal of Veterinary, Pharmaceutics and Therapeutics 10 (1987), 119-126, found that an increase in the prolactin level in the blood in turkeys after induced stress (immobilization) was avoided following intramuscular administration of Mg-Asp-HCl. The level of prolactin in the blood is a measure of the stress reaction.

In pigs, injection of Mg-Asp-HCl likewise substantially reduced the increase in parameters in the blood (e.g. adrenalin) which indicate stress (cf. Kietzmann and Jablonski, Praktischer Tierarzt 4 (1985), 328-335).

Magnesium fumarate has also long been available commercially for another purpose. In fattening pigs and piglets, supplementary feeds containing magnesium fumarate are said to reduce or stop the stress which occurs in intensive pig keeping and which manifests itself, for example, in fighting for rank, cannibalism, cardiac death and the like.

The disadvantage of magnesium fumarate-containing supplementary feeds for pigs is the fact that absorption and the resulting level of magnesium in the blood are not sufficiently high to achieve completely satisfactory reduction of the effects of stress situations, in particular when putting young pigs into sties and during transportation of fattening pigs to the slaughterhouse.

It is an object of the present invention to provide a feed for piglets, fattening pigs and poultry which avoids these disadvantages.

We have found that this object is achieved by a feed of the stated type which consists of or contains magnesium dipropionate.

The novel feed may be in any solid or liquid form. It may be formulated as a mineral single feed, as a complete feed, as a supplementary feed in the form of a protein concentrate or a mineral feed mix or as a premix. The magnesium dipropionate particularly advantageously has a mean particle size of from 0.04 to 0.2 mm, in particular from 0.06 to 0.15 mm. A particularly advantageous particle size for mixing into meal-like feeds is about 0.08 mm. The magnesium dipropionate preferably has a bulk density of from 0.40 to 0.48, in particular about 0.44, g/ml.

Advantageously, the magnesium dipropionate is obtainable by reacting magnesium hydroxide or magnesium oxide with propionic acid. This gives a product of low hygroscopicity and with a water content of <5% (by the Karl Fischer method). The content of magnesium is not less than 14% by weight and that of propionic acid is not more than 86%.

The magnesium dipropionate used in the novel feed is obtained in the preparation described above in a form which produces little or no dust. If dust production is to be completely avoided, this can be achieved by adding oil.

If magnesium dipropionate is administered as a single feed to animals, the granulated form having a particle size of from 0.4 to 1.5 mm is preferably used. This avoids dust production and achieves better feed uptake.

The novel feed may contain various additives, for example growth promoters, which are advantageously added in the form of a premix, mono- and/or dicalcium phosphate, vitamins, which are advantageously added in the form of a premix, amino acids, trace elements, cattle salt, feed lime, green alfalfa meal, molasses, DL-methionine, flavorings, wheat bran and other conventional additives.

A particularly preferred feed is one which is in the form of a mineral feed mix having the following composition:

from 15 to 30% by weight of calcium,
from 2 to 10% by weight of phosphorus,
from 2 to 8% by weight of sodium and
from 1 to 6% by weight of magnesium dipropionate, the remainder being associated anions and, if required, vitamins, trace elements, growth promoters and amino acids.

The present invention also relates to the use of magnesium dipropionate for the preparation of a feed for piglets, fattening pigs and poultry.

It is important to use magnesium dipropionate and not magnesium monopropionate. Although magnesium monopropionate is more readily soluble in water, the residual amount of free magnesium hydroxide is too high, and moreover the monopropionate is very hygroscopic, which is a disadvantage with regard to processing the feed.

We have found, surprisingly, that magnesium dipropionate has a more pronounced calming effect than magnesium fumarate in fattening pigs and piglets. This finding is described in more detail in the following description of the test.

(A) Comparison of the calming effect of magnesium dipropionate with that of magnesium fumurate and magnesium oxide in piglets and fattening pigs In doses containing equivalent amounts of magnesium, it is not to be expected, a priori, that magnesium propionate would have a greater calming effect than magnesium fumarate in fattening pigs and piglets.

The following test series compares the calming effects and the fattening results achieved for these two compounds in the piglet.

Putting young pigs with a live weight of about 20 kg into sties as well as transportation of fattening pigs with a live weight of 100 kg to the slaughterhouse constitute particular stress situations for the present-day breeds of pigs.

(a) The following test was carried out with piglets of the breed DL X Pietrain, weighing 20 kg:

Test procedure

A total of 15 litters with not less than 10 piglets per litter were available, and these litters remained in the farrowing box after weaning. Extremely heavy or light piglets were removed from the individual litters, and up to 150 piglets (10 per litter) were available for the further test.

One week before the piglets had an average weight of about 20 kg, the 15 litters were divided on a random basis into 3 groups of 5 litters each.

Group 1 was still fed with a conventional piglet-rearing feed (containing 3% of mineral feed).

The complete feed of groups 2 and 3 consisted of 4% of a mineral feed, which differed for the two groups only in respect of the Mg source.

The composition of the particular mineral feed used was as follows:

A. Composition of the novel mineral feed: containing Mg dipropionate

| |
|---|
| 25% of feed Lime |
| 22.5% of MCP (monocalcium phosphate) |
| 10% of cattle salt |
| 6% of DCP (dicalcium phosphate) |
| 6% of vitamin premix |
| 5% of trace element premix (commercial) |
| 3% of green alfalfa meal |
| 2% of molasses |
| 2% of growth promoter (commercial) |
| 1% of DL-methionine |
| 0.5% of flavorings |
| 14.5% of Mg dipropionate* |
| +2.5% of wheat bran |
| 100% total |

Analysis: Mg content of 14.2% in the magnesium dipropionate.

B. Composition of the mineral feed containing Mg fumarate according to DE-A-1 568 280

| |
|---|
| 25% of feed lime |
| 22.5% of MCP |
| 10% of cattle salt |
| 6% of DCP |
| 6% of vitamin premix (commercial) |
| 5% of trace element premix |
| 3% of green alfalfa meal |
| 2% of molasses |
| 2% of growth promoter (commercial) |
| 1% of DL-methionine |
| 0.5% of flavorings |
| 17% of Mg fumarate* |
| 100% total |

*Analysis: Mg content of 11.3% in the commercial product

C. Composition of an Mg oxide-containing, commercial mineral feed for the control group

| |
|---|
| 25% of feed lime |
| 22.5% of MCP |
| 10% of cattle salt |
| 6% of DCP |
| 8% of vitamin premix |
| 7% of trace elements |
| 3% of green alfalfa meal |
| 2% of molasses |
| 3% of magnesium oxide |
| 2% of growth promoter (commercial) |
| 1.5% of DL-methionine |
| 0.5% of flavorings |
| 9.5% of wheat bran |
| 100% total |

After the animals had received the test feed for one week, they were transferred to the early fattening sty. The following procedure was adopted here. Two piglets were taken from each of the five pens containing piglets from group 1 and were placed in a sty as a new group of 10 animals.

The same procedure was adopted for groups 2 and 3. The different feeds were accordingly retained for the individual groups.

Data acquisition

The test lasted 14 days, for one week before and one week after transfer from one sty to the other. The live weight of the piglets was determined at the beginning and at the end of the test. Feed uptake was determined by weighing the unconsumed feed.

Furthermore, the number of fights for rank within the group in the first 3 days after transfer from one sty to the other was noted, and the number of animals with clearly visible signs of fighting was recorded.

The results of the test are summarized in the Table below.

The data therein are the mean values for the test groups.

| Test group | Group 1 Control | Group 2 Mg fumarate | Group 3 Mg dipropionate |
|---|---|---|---|
| Daily feed uptake (kg/animal) | 1.08 | 1.07 | 1.08 |
| Daily weight increase (g/animal) | 408 | 429 | 447 |
| Feed consumption per kg growth increase | 2.65 | 2.49 | 2.25 |
| Number of fights for rank | | | |
| on the 1st day | 57 | 27 | 17 |
| on the 2nd day | 25 | 9 | 5 |
| on the 3rd day | 4 | 3 | 5 |
| After transfer number of animals with clearly visible injuries | 31 | 15 | 7 |
| Additional Mg uptake; mg per kg live weight | — | 47 | 44 |

| Test group | Group 1 Control | Group 2 Mg fumarate | Group 3 Mg dipropionate |
|---|---|---|---|
| per day | | | |

(b) For fattening pigs weighing 90–100 kg

These received about 40 mg of magnesium per kg live weight per day one week before the planned slaughter date. The magnesium was administered in the form of either Mg fumarate or Mg dipropionate, in addition to the feed. About 35 g of Mg fumarate or 30 g of Mg dipropionate were administered per animal per day.

A control group was simultaneously fed without Mg supplementation.

Data acquisition

Losses during transportation to the slaughterhouse and prior to slaughtering were recorded for 400 pigs per test group over a period of 9 months.

The losses were distributed as follows:

| | Losses in % |
|---|---|
| Control group | 2.0 |
| Mg fumarate group | 1.4 |
| Mg dipropionate group | 0.2 |

Comparison of the test groups is permissible since the same number of animals from all three groups were transported to the slaughterhouse on the same day.

The fattening pigs all originated from one farm with a sty capacity of 600, thus minimizing the environmental effect on the number of losses.

Hence, the losses determined can be attributed to the different Mg compounds.

Results

The fattening data in a period shortly before and shortly after transfer from one sty to the other show that additional administration of organic magnesium leads to an improvement in the fattening result.

This must predominantly be due to the fact that the animals in these groups were in general substantially calmer, owing to the greatly reduced number of fights for rank and consequent injuries.

However, the two organic magnesium compounds also show large differences in the measured and observed values. Magnesium dipropionate gives clearly better results for all criteria, which was not to be foreseen.

These results were fully confirmed by the test with the fattening pigs. In this case too, the losses were substantially smaller compared with the control and Mg fumarate groups, owing to the use of Mg dipropionate.

In general, it may be stated that, through the use of Mg dipropionate and its superior action, a substantial calming effect is achievable in the pig.

(B) Effect of administering magnesium propionate in feed for chicks and turkey chicks Chicks and turkey chicks are particularly nervous animals, and unusual visual or acoustic signals may cause them to flee. All animals flee to a corner of their coop and gather there closely against the wall. This results in losses due to crushing, which may represent enormous economic losses.

To answer the question as to what extent the administration of feed containing 3% of magnesium dipropionate would have a calming effect, a test relevant to practice was carried out with turkey chicks. Scientific investigations (Ali et al., 1987) have already shown that additional administration of organic magnesium has a stress-reducing effect.

The test was carried out in a coop which was divided into two halves by the central observation and feeding corridor.

Turkeys in the left half of the coop received a feed containing 4.5% of magnesium dipropionate, while the animals in the right half of the coup received feed without additional magnesium dipropionate. In the second test cycle, the converse procedure was adopted.

Criteria for the efficacy of the additive were the fattening result and the losses during fattening.

The results are shown in Table I below.

TABLE I

| Feature | without Mg dipropionate | with Mg dipropionate |
|---|---|---|
| Live weight | 7.2 kg | 7.6 kg |
| after 14 weeks | 6.0 kg | 6.3 kg |
| Losses during | 3.2% | 2.5% |
| fattening | 2.1% | 1.7% |

Result:

In general, the addition of Mg dipropionate to the feed led to better fattening results and fewer losses compared with the control group.

These measurable improvements were confirmed by the subjective impression of the personnel looking after the animals. Those animals which received a supplement of Mg propionate in the feed reacted susbtantially more calmly to unusual signals.

The Examples which follow illustrate the invention.

EXAMPLES 1 TO 6

Mineral feed formulations for pigs, having the compositions listed in Table II below

TABLE II

| | Example No. | | | | | |
|---|---|---|---|---|---|---|
| Composition in (%) | 1 for fattening pigs | 2 for cereal fattening | 3 for corn fattening | 4 for fast fattening | 5 for whey fattening | 6 for breeding sows |
| Calcium carbonate | 32 | 32.5 | 37.5 | 32 | 44.5 | 27 |
| Ca—Na—Mg phosphate | 35 | | 29 | | 16 | |
| Sodium chloride | 3 | 13 | 4 | 14 | | 14 |
| Molasses | 1 | 1 | 1 | 1 | 1 | 1 |
| Monocalcium phosphate | | 27.5 | | 31 | 16.5 | 36 |
| Magnesium dipropionate | 13 | 13 | 14 | 14 | 14 | 14 |
| Vitamin premix | 3 | 4 | 1.5 | 2 | 2 | 2 |
| Choline chloride | 5 | 5 | 3 | 2 | 2 | 3 |
| Trace element premix | 4 | 4 | 4 | 4 | 4 | 3 |
| Growth promoter | 4 | | 6 | | | |
| Amino acids (Lysine, methionine) | | | | | | |
| Total | 100 | 100 | 100 | 100 | 100 | 100 |

| Composition in (%) | 1 for fattening pigs | 2 for cereal fattening | 3 for corn fattening | 4 for fast fattening | 5 for whey fattening | 6 for breeding sows |
|---|---|---|---|---|---|---|
| Value-determining ingredients | | | | | | |
| Calcium | 15 | 16.8 | 16.7 | 17.0 | 20.3 | 16.5 |
| Sodium | 5 | 5 | 5 | 5 | 2 | 5 |
| Phosphorus | 6 | 6 | 5 | 7 | 6.5 | 8 |
| Magnesium | 3.3 | 1.8 | 2.9 | 1.9 | 2.4 | 1.9 |
| Recommended dose % in complete feed | 4 | 4 | 3 | 3–4 | 3 | 3 |

EXAMPLES 7 TO 12

Complete feed for pig fattening, having the compositions stated in Table III below

TABLE III

| Components (%) | 7 | 8 | 9 | 10 | 11 | 12 |
|---|---|---|---|---|---|---|
| Cereal | — | 55 | — | 54 | 30 | 30 |
| Cassava | 23 | — | 27 | — | 10 | 10 |
| Shredded soybean and soybean products | 20 | 20 | 20 | 20 | 20 | 20 |
| Animal protein carriers | 2.0 | 2.0 | 2.0 | 2.0 | 2.0 | 2.0 |
| Maisarin, shredded corn germ | 35 | 2.0 | 34.5 | 2.5 | 20 | 20 |
| High grade protein and energy carriers | 16 | 17 | 12 | 17 | 14 | 13.5 |
| Minerals | 1.5 | 1.5 | 1.5 | 1.5 | 1.5 | 1.5 |
| Vitamin premix | 1.0 | 1.0 | 1.0 | 1.0 | 1.0 | 1.0 |
| Mg dipropionate | 1.5 | 1.5 | 2.0 | 2.0 | 1.5 | 2.0 |
| Convertible energy MJ/kg | 12.6 | 13.0 | 12.6 | 13.0 | 12.8 | 12.8 |
| Raw protein % | 16.5 | 17.0 | 16.0 | 17.0 | 16.5 | 16.5 |
| Calcium % | 0.85 | 0.85 | 0.85 | 0.85 | 0.85 | 0.85 |
| Phosphorus % | 0.65 | 0.65 | 0.65 | .65 | 0.65 | 0.65 |
| Magnesium g/kg (from Mg dipropionate) | 2.1 | 2.1 | 2.8 | 2.8 | 2.1 | 2.8 |
| Sodium % | 1.10 | 1.10 | 1.10 | 1.10 | 1.10 | 1.10 |

Mixtures 7 and 9 are examples of pure substitute feeds.

Mixtures 8 and 10 are cereal-rich feeds.

Mixtures 11 and 12 contain both cereal and substitutes.

All three feed types contain different amounts of Mg dipropionate.

EXAMPLES 13 AND 14

Turkey fattening feed having the compositions stated in Table IV below

TABLE IV

| Components (%) | Example 13 | Example 14 |
|---|---|---|
| Cereal | 48 | 40 |
| Shredded soybean and soybean products | 35 | 18 |
| Animal protein carriers | 2.0 | 2.0 |
| Shredded corn germ | — | 7.0 |
| High grade energy and protein carriers | 8.0 | 25 |
| Minerals | 3.0 | 2.5 |
| Vitamin premix | 1.0 | 1.0 |
| Mg dipropionate | 3.0 | 4.5 |
| Convertible energy MJ/kg | 12.2 | 12.9 |
| Raw protein % | 23 | 16 |
| Calcium % | 1.2 | 1.1 |
| Phosphorus % | 0.8 | 0.8 |
| Magnesium g/kg (from Mg dipropionate) | 4.2 | 6.3 |
| Sodium % | 0.15 | 0.15 |

EXAMPLE 15

Supplementary feed (protein concentrate) having the composition stated in Table V:

| Components (%) | |
|---|---|
| Soybean products and shredded soybean | 32 |
| Animal protein | 53 |
| High grade protein and energy carriers | 1.0 |
| Minerals | 8.0 |
| Vitamin premix | 1.0 |
| Mg dipropionate | 5 |
| Convertible energy MJ/kg | 14.0 |
| Raw protein % | 45 |
| Calcium % | 5.5 |
| Phosphorus % | 2.0 |
| Magnesium g/kg (from Mg dipropionate) | 0.7 |
| Sodium % | 1.1 |

Mixing instructions:

70% of cereal or other starch-containing feed
   30% of protein concentrate
  100%

We claim:

1. A method for reducing stress in piglets, fattening pigs and poultry which comprises administering a dose of magnesium dipropionate effective to achieve said reduction in stress.

2. A method as claimed in claim 1, wherein the magnesium dipropionate has a mean particle size of from 0.04 to 0.2 mm, in particular from 0.06 to 0.15 mm.

3. A method as claimed in claim 1, wherein the magnesium dipropionate is in granulated form having a particle size of from 0.4 to 1.5 mm.

4. A method as claimed in claim 1, wherein the magnesium dipropionate used has a pH of about 9, measured in 10% strength solution at 25° C.

5. A method as claimed in claim 1, wherein the magnesium dipropionate has a bulk density of from 0.35 to 0.55, in particular from 0.40 to 0.48, g/ml.

6. A method as claimed in claim 1, wherein the magnesium dipropionate is obtainable by reacting magnesium hydroxide or magnesium oxide with propionic acid.

7. A method as claimed in claim 1, in the form of a mineral method mix for pigs, containing the following ingredients:
   from 15 to 30% by weight of calcium,
   from 2 to 10% by weight of phosphorus,
   from 2 to 8% by weight of sodium and
   from 1 to 6% by weight of magnesium in the form of magnesium dipropionate,
and, if required, vitamins, trace elements, growth promoters and amino acids.

8. A method as claimed in claim 1, in the form of a complete method (mixed feed) for pigs and poultry.

9. A method as claimed in claim 1, in the form of a protein-rich supplementary feed for pigs.

* * * * *